United States Patent [19]

Kim

[11] Patent Number: 5,949,504
[45] Date of Patent: Sep. 7, 1999

[54] VIEWING ANGLE CONTROL APPARATUS FOR LCD MONITOR OF CAMCORDER

[75] Inventor: Hyeong-Gweon Kim, Suwon, Rep. of Korea

[73] Assignee: Samsung Electronics Co., Ltd., Kyungki-do, Rep. of Korea

[21] Appl. No.: 08/726,688

[22] Filed: Oct. 7, 1996

[30] Foreign Application Priority Data

Oct. 7, 1995 [KR] Rep. of Korea .................. 95-34437

[51] Int. Cl.⁶ .................. G02F 1/1333; H04N 5/225
[52] U.S. Cl. .................. 349/59; 348/333; 348/376; 224/921; 396/148; 396/383
[58] Field of Search .................. 349/58; 348/333, 348/375, 376; 224/921, 923; 361/681; 396/383, 101, 148; 318/640, 649

[56] References Cited

U.S. PATENT DOCUMENTS

| 5,378,973 | 1/1995 | Kim ........................................ 318/640 |
| 5,548,334 | 8/1996 | Ichiyoshi ................................ 348/341 |
| 5,623,305 | 4/1997 | Ishizuka et al. ....................... 348/208 |
| 5,715,138 | 2/1998 | Choi et al. ............................. 361/681 |

*Primary Examiner*—William L. Sikes
*Assistant Examiner*—Kenneth Parkes
*Attorney, Agent, or Firm*—Sughrue, Mion, Zinn, Macpeak & Seas, PLLC

[57] ABSTRACT

A control apparatus for a camcorder is disclosed for maintaining an optimum viewing angle for an LCD display when the camcorder is tilted at an angle in the process of aiming the camcorder at a subject. A separate drive unit moves the LCD display with respect to the camcorder body. The amount the LCD display is moved by the drive unit is controlled based upon a sensed amount of movement of the image pickup device when the camcorder is pointed in different directions.

14 Claims, 4 Drawing Sheets

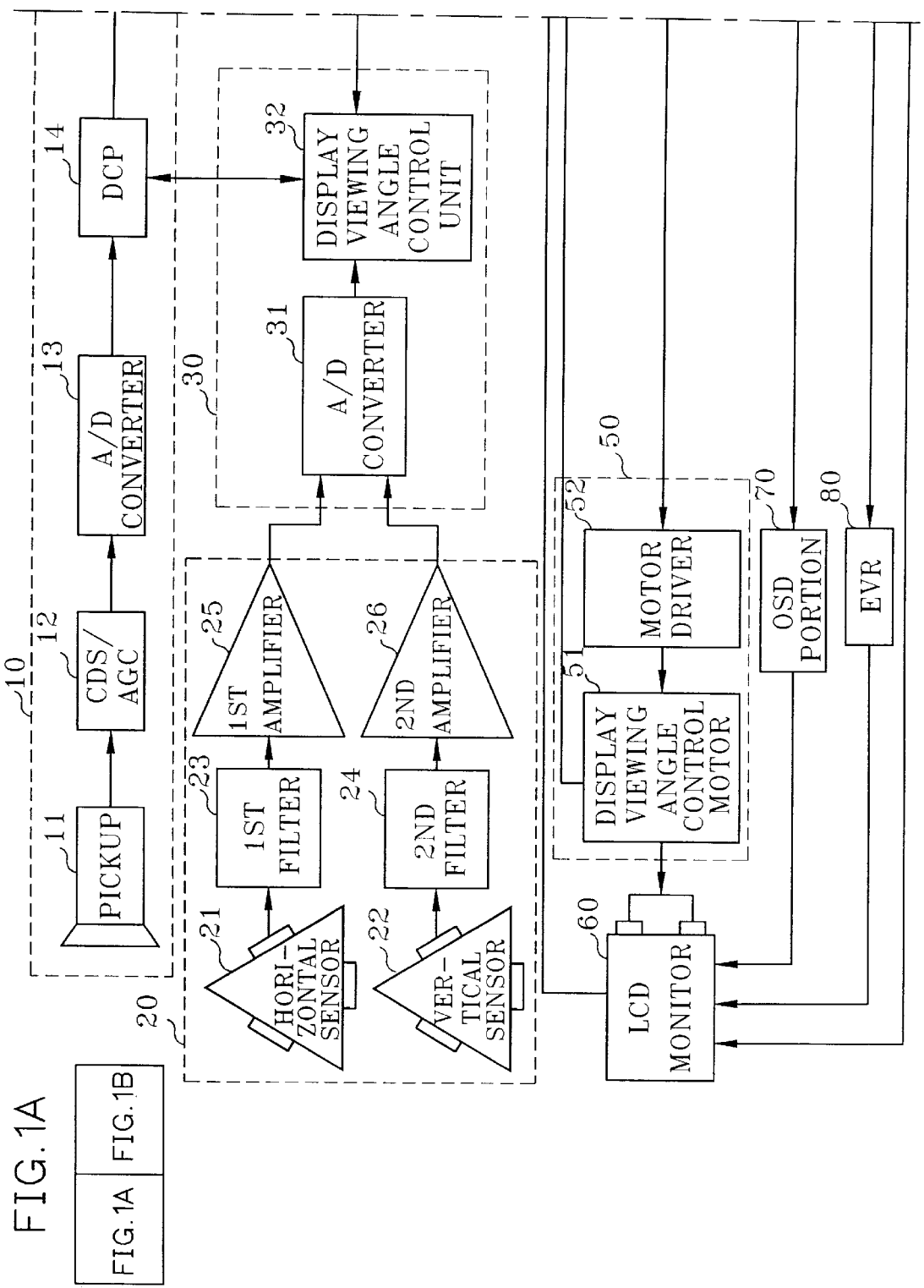

VIEWING ANGLE CONTROL APPARATUS FOR LCD MONITOR OF CAMCORDER

BACKGROUND OF THE INVENTION

The present invention relates to a liquid crystal display (LCD) monitoring apparatus using LCD devices. More particularly, the present invention relates to a display viewing angle control apparatus for an LCD monitor to allow a user to view an LCD display screen at an optimal angle, in which a separate drive unit is connected to the LCD monitor to move the monitor by an amount of movement calculated based upon a position detection sensor which senses variation of an angle of view of a camera.

A general camcorder using an LCD monitor is constructed in such a manner that a camera is incorporated into a VCR portion and the LCD monitor portion is free to move with respect to the VCR portion. In photographing by use of such a camcorder, a user takes a photograph while the user holds the left and right sides of the camcorder set and observes an object to be photographed via the LCD monitor. That is, since the camera is incorporated with the camcorder body, the camcorder set is moved in order to move the camera. The LCD monitor portion should be controlled according to an angle of view of the camera (i.e., the direction the camera lens is pointed in order for the user to view a picture to be photographed. In the conventional devices, the display viewing angle of the LCD monitor portion is controlled with one hand while the VCR portion is aimed with the other hand. This conventional manual control method causes a severe tremor of an image.

SUMMARY OF THE INVENTION

To solve the above problem, it is an object of the present invention to provide a display viewing angle control apparatus for an LCD monitor for automatically controlling the display viewing angle of the LCD monitor according to variation of an angle of view of a camera. A separate drive unit is connected to the LCD monitor to move the monitor with respect to a VCR portion. The angle of view of the camera is calculated by a position detection sensor, a target position of the LCD monitor is set according to the calculated angle of view and then the LCD monitor is moved to the target position.

To accomplish the above object of the present invention, the present invention provides a display viewing angle control apparatus for a liquid crystal display (LCD) on a camcorder. An object is photographed by an image pickup and an image of the object to be photographed is displayed via the LCD monitor. The display viewing angle control apparatus comprising:

a movement detection means for detecting the state of movement of the pickup on a realtime basis and outputting a signal indicating an amount of movement of the pickup;

a display viewing angle control amount calculation means for receiving the pickup movement amount signal and outputting an LCD monitor display viewing angle control amount signal corresponding to the pickup movement amount signal on a realtime basis;

an LCD monitor control means for receiving the LCD monitor display viewing angle control amount signal and outputting an LCD monitor display viewing angle control signal; and an LCD monitor drive means for moving the LCD monitor according to the LCD monitor display viewing angle control signal.

BRIEF DESCRIPTION OF THE DRAWINGS

The preferred embodiments are described with reference to the drawings wherein:

FIGS. 1A and 1B are block diagrams of an LCD monitor display viewing angle control apparatus according to a preferred embodiment of the invention.

DETAILED DESCRIPTION OF THE PREFERRED EMBODIMENT

A preferred embodiment of the present invention will be described below in more detail with reference to the accompanying drawings.

Figure 1B:
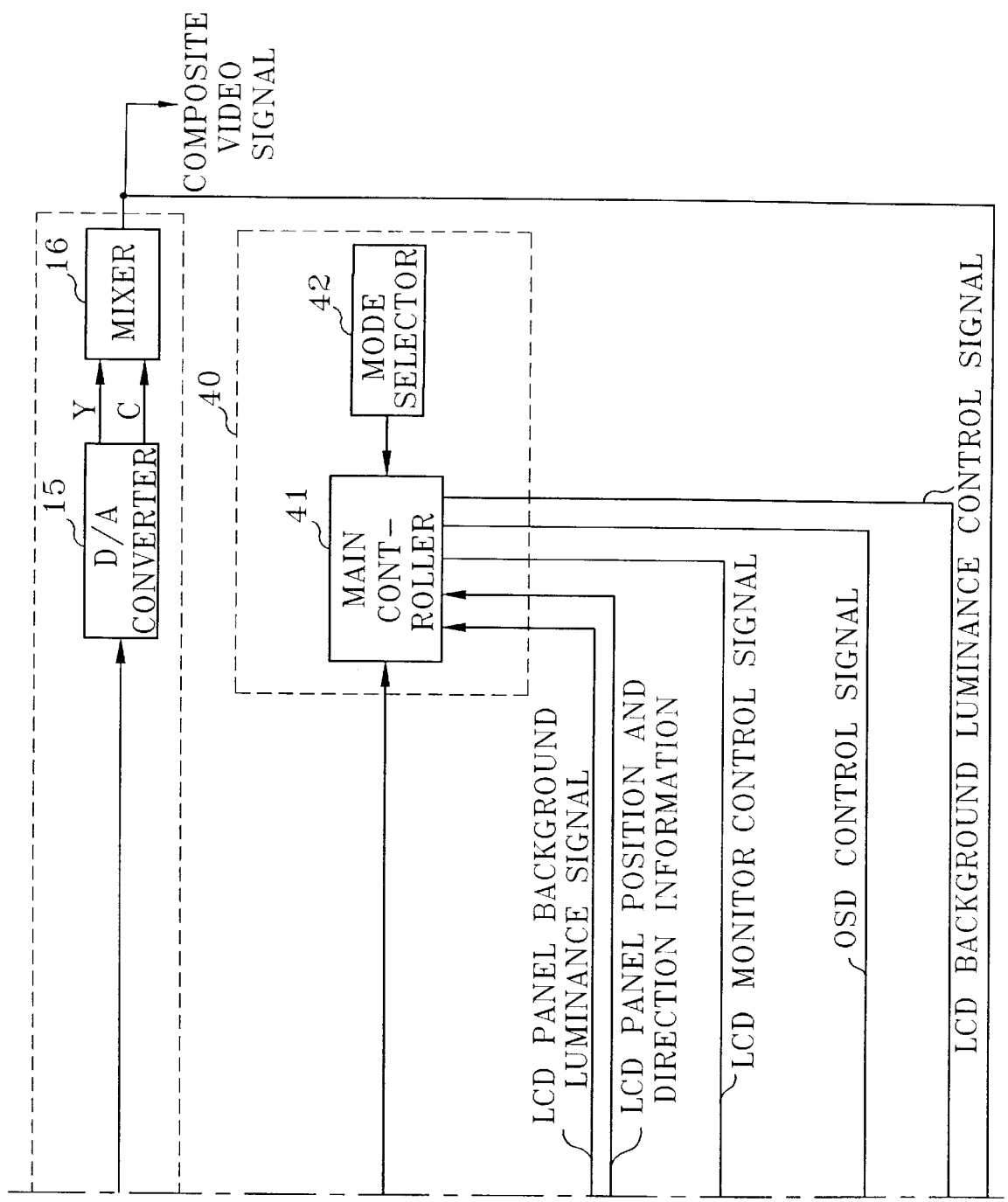

FIG. 1 shows an LCD monitor display viewing angle control apparatus according to a preferred embodiment. The LCD monitor display viewing angle control apparatus is used is an apparatus which includes a camera signal processor 10 which captures an image of an object and outputs a corresponding composite video signal. The camera signal processor 10 includes a pickup 11 for picking up an image of the object and a correlated double sampling/automatic gain controller (hereinafter called CDS/AGC) 12 for sampling the image signal applied from the pickup 11 and controlling a signal gain. An analog-to-digital (A/D) converter 13 converts an analog output signal output from the CDS/AGC 12 into a digital signal and outputs the converted result to a digital camera processor (hereinafter called DCP) 14. The camera signal processor 10 includes a digital-to-analog (D/A) converter 15 for converting the output signal output from the DCP 14 into separated analog signals Y and C and a mixer 16 for mixing the separated luminance signal Y and color signal C to output a composite video signal.

The LCD monitor display viewing angle control apparatus according to the present invention includes a movement amount detector 20 for detecting movement of the pickup 11 and outputting a pickup movement amount signal. The pickup movement amount signal is necessary for calculating an LCD monitor display viewing angle control amount. The movement amount detector 20 includes a horizontal sensor 21 for sensing the amount of the horizontal movement of the pickup 11 and a vertical sensor 22 for sensing the amount of the vertical movement of the pickup 11. The movement amount signals of the pickup which are sensed in the sensors 21 and 22 are applied to first and second filters 23 and 24, respectively. The filtered signals are output from the filters 23 and 24 to amplifiers 25 and 26, respectively, for amplification.

A display viewing angle control amount calculator receives the movement amount signals of the pickup 11 and calculates the LCD monitor display viewing angle control amount signal to control the display viewing angle of the LCD monitor. The input of calculator 30 is connected to the output end of the movement amount detector 20. The display viewing angle control amount calculator 30 includes an A/D converter 31 for digitally converting the analog pickup movement amount signals received from the first and second amplifiers 25 and 26. A display viewing angle control unit 32, connected to the output end of A/D converter 31, calculates the LCD monitor display viewing angle control amount corresponding to the pickup movement amount signal. The display viewing angle control unit 32 outputs the calculated LCD monitor display viewing angle control amount to an LCD monitor controller 40. The LCD monitor controller 40 includes a main controller 41 for receiving the LCD monitor display viewing angle control amount and outputting an LCD monitor display viewing angle control signal to a LCD monitor driver 50. Also, a mode selector 42 for inputting a key signal for selecting an display viewing angle control mode is connected to the main controller 41.

The LCD monitor display viewing angle control apparatus according to the present invention includes the LCD monitor driver 50 for controlling the display viewing angle of an LCD monitor 60 according to the LCD monitor display viewing angle control signal output from the LCD monitor display viewing angle controller 40. The LCD monitor driver 50 includes a motor driver 52 for receiving the LCD monitor display viewing angle control signal from the main controller 41 and driving the motor 51. Display viewing angle control motor 51 rotates the LCD monitor 60 according to the driving of the motor driver 52.

An on-screen-display (OSD) generator 70 outputs an OSD character to display the LCD monitor display viewing angle control amount on the LCD monitor under control of the main controller 41.

Also, the present invention apparatus includes an electronic variable resistor(EVR) portion 70 for controlling a background luminance of the LCD monitor under control of the main controller 41.

Figure 2:
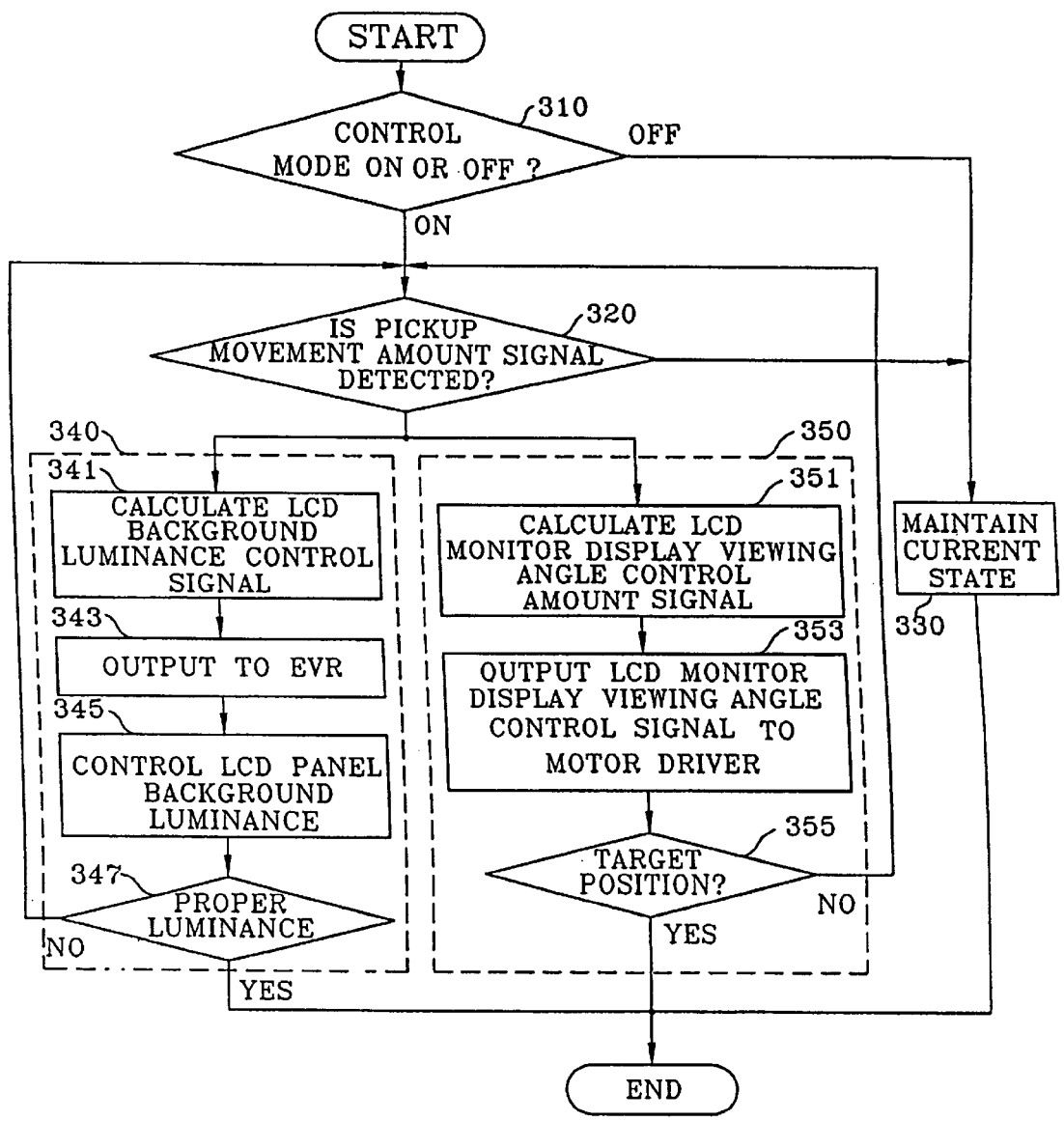
FIG. 2 is a flow-chart diagram for explaining an operation of the display viewing angle control apparatus according to the present invention.
Figure 3A:
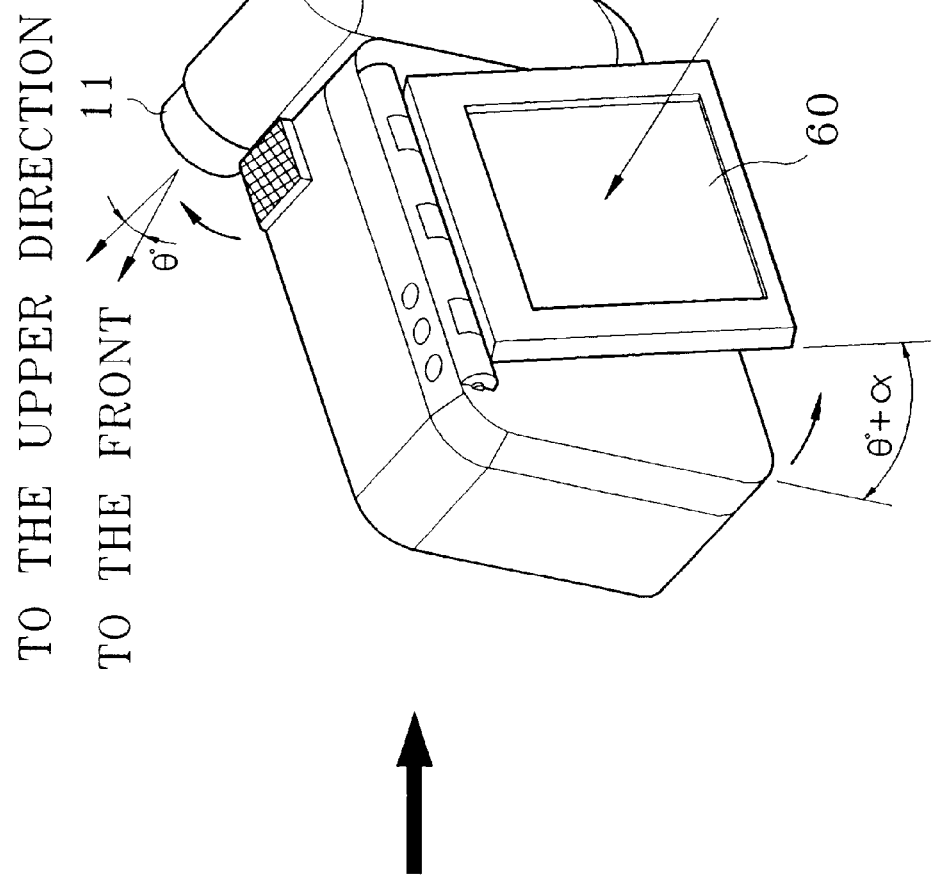
FIGS. 3A and 3B show an appearance of the camcorder for explaining the respective states prior to or after operation of the LCD monitor display viewing angle control apparatus according to the present invention.
Figure 3B:
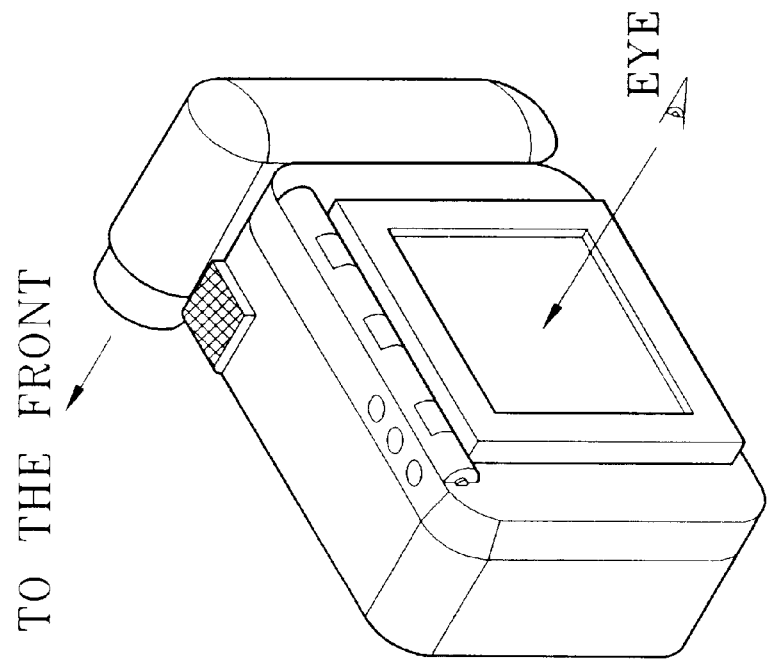

FIG. 2 is a flow-chart diagram for explaining operation of the display viewing angle control apparatus according to the present invention. FIGS. 3A and 3B show the appearance of the camcorder for explaining the respective states prior to and after operation of the LCD monitor display viewing angle control apparatus according to the present invention.

Hereinafter, the operation of the apparatus according to the present invention will be described with reference to FIGS. 2, 3A and 3B.

First, the main controller 41 judges whether a select key for selecting an LCD monitor display viewing angle control mode is input via the mode selector 42 (step 310). If the control mode is in the "off" state, the apparatus maintains the current state (step 330). However, if the control mode is in the "on" state, the apparatus performs a display viewing angle control operation of the LCD monitor (steps 340 and 350).

The pickup 11 senses the image of the object and converts the image into an electrical signal. The CDS/AGC 12 performs a correlated double sampling and automatically controls the gain of the signal received from the pickup 11 and outputs the result to the A/D converter 13. The A/D converter 13 converts the analog image signal output from the CDS/AGC 12 into a digital image signal and outputs the digitally converted signal to the DCP 14. The DCP 14 outputs the information regarding the input image including picture edge data and automatic white balance data, to the display viewing angle control unit 32. The main controller 41 transfers a picture quality control signal to the DCP 14 via the display viewing angle control unit 32. The DCP 14 processes the analog data received from the A/D converter 13 according to the picture quality control signal into digital data and outputs the processed digital data. The D/A converter 15 converts the processed digital signal output from the DCP 14 into an analog signals Y and C and outputs the converted analog signals. The mixer 16 mixes the signals which are output from the D/A converter 15 after being separated into the luminance signal Y and the color signal C in the D/A converter 15, and outputs a composite video signal to the LCD monitor 51.

Meanwhile, the horizontal sensor 21 detects the state of the left and right movement of the pickup on a real time basis and outputs the left and right movement amount signal to a first filter 23. Also, the vertical sensor 22 detects the state of the up and down movement of the pickup on a real time basis and outputs the up and down movement amount signal to a second filter 24. These filters 23 and 24 band-limit the received pickup movement amount signals and output the band-limited signals to the first and second amplifiers 25 and 26. The amplifiers 25 and 26 amplify the received pickup movement amount signals into a predetermined amplification factor and output the amplified signals, respectively. The A/D converter 31 mixes the pickup movement amount signals received from the amplifiers 25 and 26 and converts the mixed signal into a digital signal to output the converted result to the display viewing angle control unit 32.

The display viewing angle control unit 32 judges whether there is a pickup movement amount signal detected by the sensors 21 and 22 (step 320). If the pickup movement amount signals are generated by the sensors 21 and 22 do not exist, the apparatus maintains a current state (step 330). Otherwise, if there esixt the pickup movement amount signals detected by the sensors 21 and 22, the apparatus performs a step 350 for calculating the LCD monitor display viewing angle control amount according to the detected pickup movement amount signals.

The display viewing angle control unit 32 receives the pickup movement amount signals and calculates the LCD monitor display viewing angle control amount. The display viewing angle control unit 32 receives the digitally converted pickup movement amount signal from the A/D converter 31. The display viewing angle control unit 32 calculates the LCD monitor display viewing angle control amount signal according to the angle of the current LCD monitor panel and the specifications of the motor which is used (step 351). The main controller 41 outputs the LCD monitor display viewing angle control signal for driving the LCD monitor 60, according to the LCD monitor display viewing angle control amount, to the motor driver 52 (step 353). The motor driver 52 outputs a motor drive signal for driving the display viewing angle control motor 51 according to the display viewing angle control signal of the LCD monitor applied from the main controller 41. The display viewing angle control motor 51 rotates according to the motor drive signal of the motor driver 52 and moves the LCD panel of the LCD monitor 60 to a corresponding target position (step 355). The information of the position and direction of the LCD panel according to the rotation of the display viewing angle control motor 51 is fed back to the main controller 41. The main controller 41 compares the position of the LCD panel according to rotation of the display viewing angle control motor 51 with the LCD monitor display viewing angle control amount signal and judges whether the position of the LCD panel is coincident with the target position (step 357). If the current position coincides with the target position, the position movement of the LCD panel is completed (step 357). If the movement position of the LCD panel does not coincide with the target position, the apparatus returns to step 320 to repetitively perform the steps 320–357.

Additionally, the present invention apparatus may be embodied to further include a unit for displaying the LCD monitor display viewing angle control amount on the LCD monitor. The main controller 41 outputs the OSD control signal to the OSD portion 70 so that the LCD monitor display viewing angle control amount signal is displayed as the OSD character. The OSD portion 70 displays the LCD monitor display viewing angle control amount signal in a predetermined position on the LCD monitor 60.

The apparatus according to the present invention may also be embodied to perform the steps of automatically varying the display viewing angle of the LCD monitor while at the same time controlling to have a proper background luminance according to various display viewing angles of the LCD monitor. The LCD background luminance control step 340 will be described below. The main contoller 41 calculates an LCD background luminance control signal corresponding to the LCD monitor display viewing angle control amount signal received from the display viewing angle control unit 32 (step 343). The main controller 41 outputs the calculated LCD background luminance control signal to the EVR 80 (step 343). The EVR 80 controls the background luminance of the LCD panel in the LCD monitor 60 according to the LCD background luminance control signal (step 345). The background luminance signal of the LCD panel is fed back to the main controller 41. The main controller 41 judges whether the current luminance is coincident with the predetermined background luminance according to the position of the LCD panel (step 347). If the current luminance is not the proper luminance, the apparatus returns to step 320 to repetitively perform the steps 320–357.

FIGS. 3A and 3B show an apperance of the camcorder for explaining, the respective states prior to and after operation of the LCD monitor display viewing angle control apparatus according to the present invention. As shown in FIG. 3B, when a user records a video image of an object while observing the object via the LCD monitor 60 and points the pickup 11 upwardly by θ°, the LCD panel in the LCD monitor 69 is moved by θ°+α, so that the camcorder user of the present invention can monitor the picture to be recorded irrespective of the movement of the pickup.

As described above, the present invention provides for the optimal picture monitoring although the camcorder has been moved. When an object to be recorded is monitored via the LCD monitor in a camcorder having the incorporated camera and VCR incorporated together, the display viewing angle of the LCD monitor can be properly varied even though an angle-of-view of the camera has been varied due to the movement of the camera.

While only certain embodiments of the invention have been specifically described herein, it will be apparent that numerous modifications may be made thereto without departing from the spirit and scope of the invention.

What is claimed is:

1. A display viewing angle control apparatus for use in a camcorder, the camcorder having an image pickup which picks up an image of an object and a monitor on which the image of the object is displayed, the display viewing angle control apparatus comprising:

movement detection means for detecting the state of movement of said pickup on a realtime basis and outputting a signal indicating an amount of movement of said pickup;

display viewing angle control amount calculation means for receiving said signal indicating an amount of movement of said pickup and outputting, on a realtime basis, a monitor display viewing angle amount signal corresponding to said signal indicating an amount of movement of said pickup;

monitor control means for receiving said monitor display viewing angle amount signal and outputting a monitor display viewing angle control signal;

monitor drive means for moving said monitor according to the monitor display viewing angle control signal; and an OSD portion for displaying the display viewing angle amount signal as an OSD character.

2. The display viewing angle control apparatus according to claim 1, wherein said movement detection means comprises:

a sensor portion for sensing movement of said pickup and outputting a pickup movement amount signal;

a filter portion for band-limiting the pickup movement amount signal sensed in said sensor portion; and an amplifier portion for amplifying the pickup movement amount signal band-limited in said filter portion.

3. The display viewing angle control apparatus according to claim 1, wherein said display viewing angle control amount calculation means comprises:

an analog-to-digital (A/D) converter for converting the signal indicating an amount of movement of said pickup, received from said movement amount detection means, into a digital signal; and a display viewing angle control unit for calculating the display viewing angle amount signal based upon the digitized signal indicating an amount of movement of said pickup.

4. The display viewing angle control apparatus according to claim 1, wherein said monitor drive means comprises:

a motor driver for receiving the monitor display viewing angle control signal from said monitor control means and outputting a motor drive signal; and a motor which rotates according to the motor drive signal of said motor driver, to change the display viewing angle of said monitor.

5. The display viewing angle control apparatus according to claim 1, wherein said display comprises a liquid crystal display.

6. A display viewing angle control apparatus for use in a camcorder, the camcorder having an image pickup which picks up an image of an object and a monitor on which the image of the object is displayed, the display viewing angle control apparatus comprising:

movement detection means for detecting the state of movement of said pickup on a realtime basis and outputting a signal indicating an amount of movement of said pickup;

display viewing angle control amount calculation means for receiving said signal indicating an amount of movement of said pickup and outputting, on a realtime basis, a monitor display viewing angle amount signal corresponding to said signal indicating an amount of movement of said pickup;

monitor control means for receiving said monitor display viewing angle amount signal and outputting a monitor display viewing angle control signal; and monitor drive means for moving said monitor according to the monitor display viewing angle control signal;

wherein said monitor control means further comprises an electronic variable resistor (EVR) for calculating a background luminance control signal corresponding to the monitor display viewing angle amount signal and controlling background luminance of the display according to the background luminance control signal.

7. A display viewing angle control apparatus for use in a camcorder, the camcorder having an image pickup which picks up an image of an object and a monitor on which the image of the object is displayed, the display viewing angle control apparatus comprising:

movement detection means for detecting the state of movement of said pickup on a realtime basis and outputting a signal indicating an amount of movement of said pickup;

display viewing angle control amount calculation means for receiving said signal indicating an amount of movement of said pickup and outputting, on a realtime basis, a monitor display viewing angle amount signal corresponding to said signal indicating an amount of movement of said pickup;

monitor control means for receiving said monitor display viewing angle amount signal and outputting a monitor display viewing angle control signal; and monitor drive means for moving said monitor according to the monitor display viewing angle control signal;

wherein said monitor control means compares a position signal of said monitor which is fed back from said monitor drive means with the monitor display viewing angle amount signal calculated in said display viewing angle control amount calculation means and outputs the monitor display viewing angle control signal until the position of the monitor is coincident with a target position thereof.

8. A display viewing angle control apparatus for use in a camcorder, the camcorder having an image pickup which picks up an image of an object and a monitor on which the image of the object is displayed, the display viewing angle control apparatus comprising:

a realtime movement detector having as an output a pickup movement amount signal indicative of an amount of movement of said pickup in realtime;

an realtime angle calculator which receives said pickup movement amount signal as an input and which has as an output a monitor viewing angle amount signal corresponding to said Pickup movement amount signal on a realtime basis;

a monitor viewing angle controller which receives the monitor viewing angle amount signal as an input and which has as an output a monitor viewing angle control signal;

a monitor driver in mechanical communication with said monitor to move said monitor according to the monitor viewing angle control signal, to control a display viewing angle of said monitor; and an on-screen-display (OSD) generator which receives the monitor viewing angle amount signal as an input and which provides as an output an OSD character signal for display on said monitor.

9. The display viewing angle control apparatus according to claim 8, wherein said realtime movement detector comprises:

a sensor having as an output a pickup motion signal;

a filter which receives said pickup motion signal as an input and which band-limits the inputted pickup motion signal to produce a band-limited signal as an output; and an amplifier which receives said band-limited signal as an input and which amplifies the band-limited signal to produce said pickup movement amount signal.

10. The display viewing angle control apparatus according to claim 8, wherein said realtime angle calculator comprises:

an analog-to-digital (A/D) converter which converts said pickup movement amount signal into a digitized movement signal; and a viewing angle control unit which receives said digitized movement signal as an input and which calculates the monitor viewing angle amount signal based upon the digitized movement signal.

11. The display viewing angle control apparatus according to claim 8, wherein said monitor driver comprises:

a motor driver which receives as an input the monitor viewing angle control signal and has as an output a motor drive signal; and a motor which rotates according to the motor drive signal of said motor driver, to change the display viewing angle of said monitor.

12. The display viewing angle control apparatus according to claim 8, wherein said monitor comprises a liquid crystal display.

13. A display viewing angle control apparatus for use in a camcorder, the camcorder having an image pickup which Picks up an image of an object and a monitor on which the image of the object is displayed, the display viewing angle control apparatus comprising:

a realtime movement detector having as an output a pickup movement amount signal indicative of an amount of movement of said pickup in realtime;

an realtime angle calculator which receives said pickup movement amount signal as an input and which has as an output a monitor viewing angle amount signal corresponding to said Pickup movement amount signal on a realtime basis;

a monitor viewing angle controller which receives the monitor viewing angle amount signal as an input and which has as an output a monitor viewing angle control signal; and a monitor driver in mechanical communication with said monitor to move said monitor according to the monitor viewing angle control signal, to control a display viewing angle of said monitor;

wherein said monitor viewing angle controller comprises an electronic variable resistor which receives said monitor viewing angle amount signal as an input, and which has as an output a background luminance control signal corresponding to the monitor display viewing angle amount signal, wherein background luminance of the display is controlled according to the background luminance control signal.

14. A display viewing angle control apparatus for use in a camcorder, the camcorder having an image pickup which picks up an image of an object and a monitor on which the image of the object is displayed, the displace viewing angle control apparatus comprising:

a realtime movement detector having as an output a pickup, movement amount signal indicative of an amount of movement of said pickup in realtime;

an realtime angle calculator which receives said pickup; movement amount signal as an input and which has as an output a monitor viewing angle amount signal corresponding to said pickup movement amount signal on a realtime basis;

a monitor viewing angle controller which receives the monitor viewing angle amount signal as an input and which has as an output a monitor viewing angle control signal; and a monitor driver in mechanical communication with said monitor to move said monitor according to the monitor viewing angle control signal, to control a display viewing angle of said monitor;

wherein said monitor viewing angle controller produces said monitor viewing angle control signal by comparing a position signal of said monitor which is fed back from said monitor driver with the monitor viewing angle amount signal calculated in said realtime angle calculator until the position of the monitor is coincident with a target position thereof.

* * * * *